Sept. 12, 1933.                 S. BLASHOW                      1,926,137
              MEASURING DEVICE FOR MEDICINAL POWDERS
                   Filed April 19, 1932      2 Sheets-Sheet 1
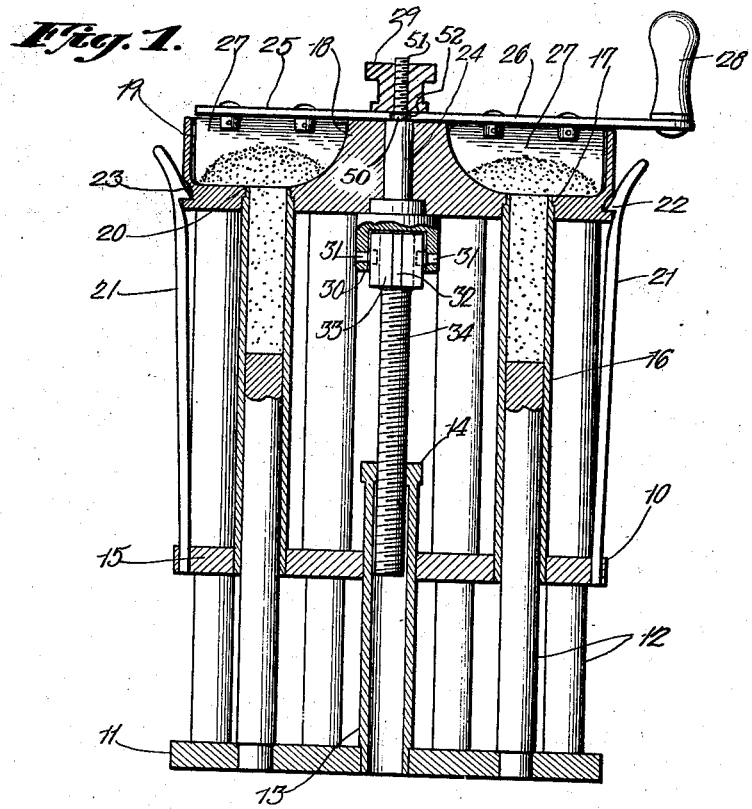
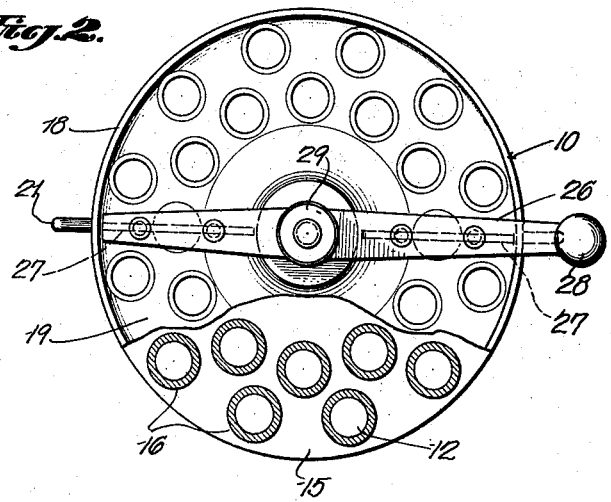
Inventor
SAMUEL BLASHOW.
By Clarence A O'Brien
                    Attorney Sept. 12, 1933.  S. BLASHOW  1,926,137
MEASURING DEVICE FOR MEDICINAL POWDERS
Filed April 19, 1932  2 Sheets-Sheet 2
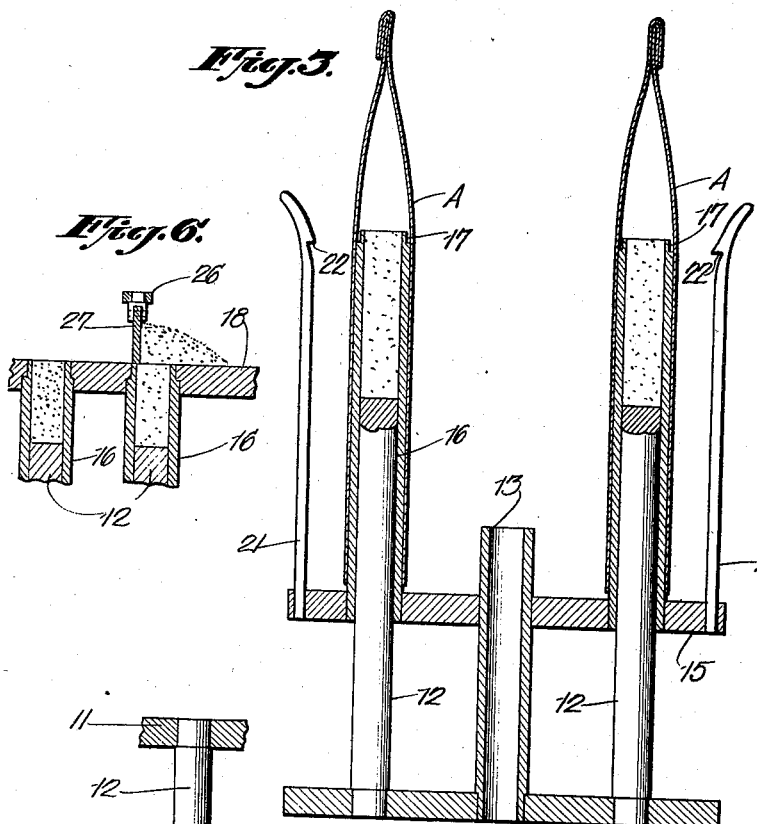
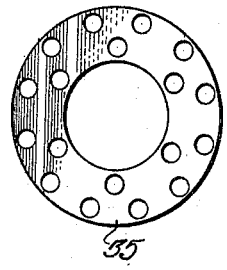
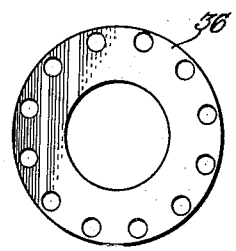
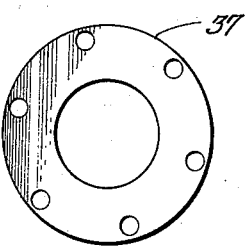
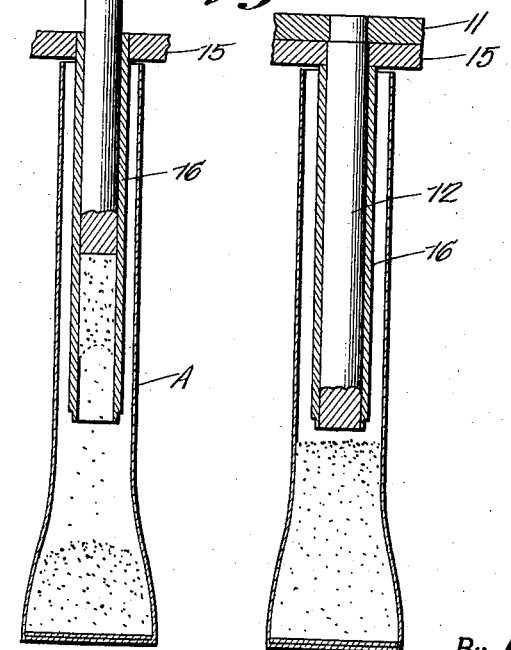
Inventor
SAMUEL BLASHOW.
By Clarence A. O'Brien
Attorney Patented Sept. 12, 1933

1,926,137

UNITED STATES PATENT OFFICE 1,926,137

MEASURING DEVICE FOR MEDICINAL POWDERS

Samuel Blashow, Riverdale, N. Y.

Application April 19, 1932. Serial No. 606,187

6 Claims. (Cl. 226—105)

This invention relates to measuring devices and has particular reference to a device for accurately measuring and packaging medicinal powders by druggists, doctors, and those putting up such pharmaceutical preparations.

It is the present practice by druggists when compounding medicinal powder mixtures to measure the amount of the various ingredients sufficient to prepare a particular number of doses to place the ingredients in the usual mixing bowl and thoroughly mix the same with a pestal. After the mixing operation it is customary to either weigh the amount for specific doses or spread paper wrappers and evenly distribute the medicinal powder therein, trusting to the eye of the operator to empty a proportionate amount in each wrapper. These operations are either slow or inaccurate, and the object of my invention is to overcome this practice which is accomplished by a device wherein a quantity of medicinal powder may be equally distributed into a plurality of receivers and the contents of the receivers emptied into envelopes without loss by spillage.

Another feature of the invention resides in a measuring device having the above characteristics which is simple of construction, easy and positive in operation, and inexpensive of manufacture.

With these and other objects in view, the invention resides in the certain novel construction, combination and arrangement of parts, the essential features of which are hereinafter fully described, are particularly pointed out in the appended claims, and are illustrated in the accompanying drawings, in which, Figure 1 is a vertical longitudinal sectional view through my improved measuring device.

Figure 2 is a top plan view of the same.

Figure 3 is a detail vertical sectional view showing the manner in which the packaging envelopes are positioned upon the filled tubes preparatory to emptying the same.

Figure 4 is a fragmentary detail vertical sectional view showing the contents of the measuring tubes in a partially emptied position.

Figure 5 is a view similar to Figure 4, but showing the contents of the measuring tube fully emptied.

Figure 6 is a detail sectional view illustrating the manner in which the powder is distributed into the measuring tubes.

Figures 7, 8 and 9 are plan views of masks which may be used in connection with the device to mask out various amounts of measuring tubes.

Referring to the drawings by reference characters, the numeral 10 designates my improved measuring and distributing device in its entirety which includes a circular disc or base plate 11 having one or more series of radially spaced posts 12 fixedly mounted thereon and rising upwardly therefrom. Fixedly supported centrally of the plate 11 and rising therefrom is a tubular sleeve 13 on which there is an integral apertured and threaded cap 14 which threadedly receives a screw shaft presently to be described.

Slidable upon the posts 12 is a carrier disc 15 having one or more series of radially spaced upstanding tubes 16 supported thereon and which tubes open through the bottom face of the disc 15 and telescopes the respective posts 12. The upper ends of the tubes 16 are provided with reduced portions or shoulders 17, while seated upon the shoulders 17 is a circular head 18. The head 18 is provided with an annular trough or hopper 19, the bottom of which is provided with openings 20 which receive the upper ends of the respective tubes 16. The head 18 is removable from the tubes for a purpose to be presently explained, but is held seated thereon by spring clamps 21, which are fixedly carried by the disc 15 and provided with teeth or shoulders 22 which are received in an annular groove or channel 23 formed in the periphery of the head 18. The posts 12 and the tubes 16 are approximately the same length so that when the plate 15 is in a down position upon the base plate 11, the tops of the posts 12 are flush with the bottom wall of the trough or recess 19.

Extending centrally through the head 18 is a stub shaft 24 on which a spreader member 25 is turnably mounted. Shaft 24 has a reduced square shoulder 50 and a threaded stem 51 rising therefrom. The member 25 consists of a cross arm 26 through which the stub shaft 24 extends and which cross arm supports a pair of diametrically oppositely disposed flexible blades 27. A square central opening 52 on cross arm 26 conformably fits shoulder 50 on stub shafts 24. One end of the arm 26 extends beyond the periphery of the head 18 and carries an upstanding handle or hand grip 28. The arm 26 is rotatably secured in position by resting upon the central portion of the head 18 while a nut 29 is threaded to the upper end of the stub shaft 24.

The lower end of the stub shaft 24 is formed with a socket 30 having key pins 31 extending inwardly therefrom and which pins engage the walls of channels 32 formed in the head 33 carried by the top of a screw shaft 34. The lower end of the shaft 34 is threadedly connected to the nut 14 and extends into the tubular sleeve 13. By operatively connecting the stub shaft 24 to the screw shaft 34 by the pin connection, it is possible to separate the head 18 from the tubes 16 by merely releasing the clamp 21 and which is necessary for the purpose to be presently explained.

In practice, assume that the parts in normal position at which time the carrier plate 15 is resting upon the base plate 11 with the tops of the posts 12 flush with the bottom wall of the hopper or trough 19. After the medicinal powder has been mixed and is ready for packaging, the same is emptied into the trough or hopper 19. The operator then grasps the handle 28 and imparts a turning movement to the spreader member 25 which causes the flexible wiping blades 27 to spread the powder around the trough. Simultaneously with the turning of the spreader member 25 the screw 34 is rotated, and which causes the feeding of the head and tubes 16 upwardly, thus increasing the feeding capacity of the tubes 16. As the capacity increases, more of the powder is received in the tubes and is packed therein by reason of the blades 27 passing over the open tops of the tubes 16. As the contents of the hopper 19 is received by the respective tubes 16, more of the powder may be poured thereinto until the predetermined amount of the mixture has been equally distributed into the respective tubes 16. At this time, the operator releases the clamp 21 and removes the head 18 therefrom, leaving the tube and the other parts in the position shown in Figure 3 of the drawings. The operator then inserts the open end of the envelope A over the top of the respective tubes 16, and proceeds to invert the tubes and their correlated parts to the position shown in Figure 4 of the drawings. When inverted in this position, the packing of the powder thereinto may not permit the same to drop by gravity into the envelopes A, but by merely pressing down upon the base plate 11, the posts 12 act as ejectors for the contents of the tube as seen in Figure 5 of the drawings.

From the foregoing description, it will be seen that a druggist may compound a medicinal powder mixture of a predetermined amount and equally distribute the powder into separate individual receivers in order to assure an equal dose of the mixture in each package. The advantages of this device are clearly set forth hereinbefore, and it is not deemed necessary to repeat the same.

In the drawings, I have illustrated a measuring and distributing device capable of putting up twenty-four doses of a medicinal powdered preparation, but if desired, any predetermined numbers of these receiving tubes may be masked out by the insertion of masking discs or members over the head 18 to seat within the trough or recess 19. In Figure 7 of the drawings, I have shown a mask member 35 containing eighteen openings which register with a corresponding amount of the tubes 16, thus masking out six of the tubes. In Figure 8 I have shown a mask 36 having twelve openings whereby all but twelve of the tubes 16 are masked out. In Figure 9 I have shown a mask member 37 provided with only six openings which will of course mask out all of the tubes except that number. It is customary when preparing medicinal powders to put them up in multiples of six, hence the particular number of tubes and openings in the various masking elements.

While I have shown and described what I deem to be the most desirable embodiment of my invention, I wish it to be understood that various changes as come within the scope of the appended claims may be resorted to if desired.

Having thus described the invention, what I claim as new and desire to secure by Letters Patent is:—

1. A measuring device for powdered substances comprising a base, a plurality of posts rising from said base, a head having an annular recess therein, filling tubes associated with said head and telescoping said posts and opening into said recess, a manually rotatable spreader member movable in said recess, and means operable upon rotation of said spreader member to move said head in either direction relative to said base and posts to increase or decrease the capacity of said filling tubes.

2. A measuring device comprising a plurality of fixed posts, a head having an annular trough therein, a plurality of filling tubes extending to said head and opening into said trough, clamping means for removably securing said head and said filling tubes in operative relation, a spreader member rotatably mounted on said head and movable in said trough, a handle on said spreader member to permit manual rotation thereof, and screw means for sliding said tubes over said posts in either direction to increase or decrease the capacity of said filling tubes.

3. A measuring device for powdered substances comprising a head having a hopper, individual receiving compartments opening into said hopper, a rotatable spreader member mounted in said head and movable within said hopper, and means operable upon rotation of said spreader member for increasing and decreasing the receiving capacity of said receiving compartments.

4. A measuring device for powdered substances comprising an annular head having an annular trough therein, a plurality of indivdual receiving compartments opening into said trough and arranged in spaced relation about the axial center of said head, a spreader member rotatably mounted on said head and movable within said trough, and means operable upon rotation of said spreader member for simultaneously increasing or decreasing the capacity of said receiving compartments.

5. A measuring device for powdered substances comprising a base, a plurality of posts rising from said base, a carrier slidable upon said posts, a plurality of measuring tubes fixedly carried by said carrier and telescoping the respective posts, a head formed with a trough therein having openings into which one of the ends of said tubes fit, clamping means for removably securing said head upon said tubes, a spreader member rotatably mounted on said head and movable in said trough, and screw means operable upon rotation of said spreader member for imparting a sliding movement to said head and tubes relative to said posts.

6. A measuring device for powdered substances comprising a head having a receiving hopper, a plurality of compartments opening into said hopper, rotatable means for spreading a substance placed in said hopper into the respective compartments, and means for simultaneously varying the capacity of said compartments upon operation of said rotatable means.

SAMUEL BLASHOW.